United States Patent
Pugh (10) Patent No.: US 6,486,626 B1
(45) Date of Patent: Nov. 26, 2002

(54) APPARATUS AND A METHOD FOR CONTROLLING AN ELECTRIC VEHICLE

(75) Inventor: Gavin Scott Pugh, Hampshire (GB)

(73) Assignee: Elliott Industries Limited, London (GB)

( * ) Notice: Subject to any disclaimer, the term of this patent is extended or adjusted under 35 U.S.C. 154(b) by 0 days.

(21) Appl. No.: 09/830,004

(22) PCT Filed: Oct. 21, 1999

(86) PCT No.: PCT/GB99/03479

§ 371 (c)(1),
(2), (4) Date: Aug. 22, 2001

(87) PCT Pub. No.: WO00/23296

PCT Pub. Date: Apr. 27, 2000

(30) Foreign Application Priority Data

Oct. 21, 1998 (GB) .............................................. 9823057

(51) Int. Cl.$^7$ ................................................. H02P 3/14
(52) U.S. Cl. ........................ 318/139; 318/376; 318/434
(58) Field of Search ................................ 318/139, 376, 318/434, 254; 388/800, 815; 180/6.5

(56) References Cited

U.S. PATENT DOCUMENTS

| | | | |
|---|---|---|---|
| 4,422,515 A | * 12/1983 | Loveless ..................... | 318/139 |
| 4,634,941 A | 1/1987 | Klimo | |
| 4,814,678 A | 3/1989 | Omae et al. | |
| 5,022,476 A | 6/1991 | Weege | |
| 5,487,437 A | 1/1996 | Avitan | |
| 6,072,292 A | * 6/2000 | Uchiyama et al. .......... | 318/376 |

FOREIGN PATENT DOCUMENTS

| | | |
|---|---|---|
| EP | 0080278 | 6/1983 |
| WO | WO 90/02066 | 3/1990 |

OTHER PUBLICATIONS

"HD–Series", PML—Homepage, Online, Apr. 3, 1998, Retrieved from the Internet : www.axiompml.com/html/hdseries.

* cited by examiner

Primary Examiner—Khanh Dang
(74) Attorney, Agent, or Firm—Westerman, Champlin & Kelly, P.A.

(57) ABSTRACT

Control apparatus for an electric vehicle is described, the control apparatus comprising input means operable to generate a first signal indicative of a component of a desired motion of the vehicle and a second signal independently indicative of said component; an electric motor arranged to drive a wheel of the vehicle; a controller arranged to control the motor according to said first signal; and means for generating a signal indicative of a voltage across windings of the motor, the controller further including: means for calculating a quantity indicative of a nominal expected voltage across said windings according to said second signal; means for comparing said voltage with said expected voltage; and means for generating an error signal in response to said voltage and expected voltage differing by more than a predetermined amount. A corresponding method of controlling an electric vehicle is also described.

32 Claims, 5 Drawing Sheets

APPARATUS AND A METHOD FOR CONTROLLING AN ELECTRIC VEHICLE

This application is a national stage filing under 35 U.S.C. §371 and priority is hereby claimed on International Application No. PCT/GB99/03479, Filed Oct. 21, 1999, which International Application was published in English as No. WO 00/23296.

The present invention relates to control apparatus for electric vehicles, and in particular to error or fault detection in control apparatus arranged to drive the vehicle.

Figure 1:
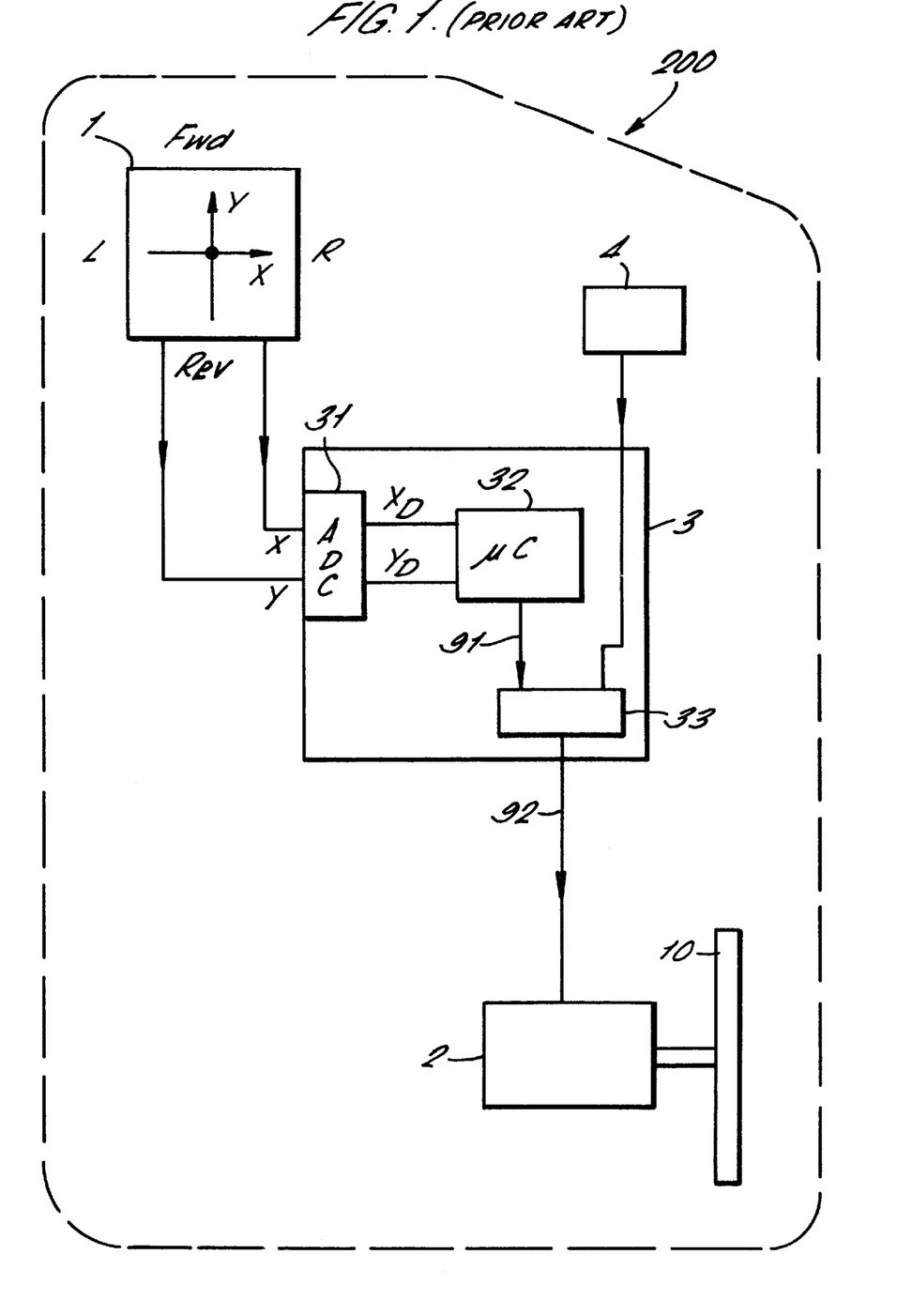
FIG. 1 is a schematic diagram of an electric vehicle in accordance with the prior art.

Electric vehicles are well-known and an example 200 is shown in FIG. 1. The electric vehicle 200 comprises input means 1 which is operable by a user or driver to indicate a desired motion of the vehicle. In the case of electric wheelchairs, the input means is typically a joystick to facilitate control. The joystick generates an X signal indicative of the component of a joystick deflection along a nominal X axis and a Y signal indicative of the component of the deflection along a nominal Y axis. Usually the Y axis is aligned with the forward-reverse axis of the vehicle and movement of the joystick in the X direction corresponds to left-right movement. Thus, the Y signal is indicative of a desired forward-reverse motion of the vehicle and the X signal is indicative of a desired turning motion of the vehicle. The X and Y signals generated by the joystick are usually analogue signals and are transmitted to a controller 3 where they are converted into digital signals $X_D$ and $Y_D$ by an analogue to digital converter (ADC) 31. The digital signals are processed by a microprocessor or microchip 32 which outputs a control signal 91 used to control the speed of a motor 2 arranged to drive a wheel 10 of the vehicle. In FIG. 1, only one motor 2 and one wheel 10 are shown. Typically however, the vehicle will comprise two driven wheels and two corresponding driving motors. Turning motion is achieved by driving the wheels at different respective angular velocities and forward-reverse motion is achieved by driving the two wheels at a common angular velocity.

In general, the control signal 91 is a function of (i.e. it is determined by or calculated from) both the X and Y inputs.

The control signal 91 is used to control circuitry 33 which regulates the supply of power from a battery 4 to the motor 2. The circuitry 33 outputs a further control signal 92, which is a voltage signal applied to the motor.

A problem with the arrangement shown in FIG. 1 is that a fault in the input means, controller hardware or software may affect the motor control signal 92 and may result in the wheel being driven at an inappropriate speed, i.e. the user may lose control. Clearly this is undesirable and may be dangerous.

So-called dual decode joysticks are known which, in addition to generating X and Y signals, also produce nominal inverse outputs $X_i$ and $Y_i$. X and $X_i$ are independently indicative of the X position of the joystick, and similarly Y and $Y_i$ are independently indicative of its Y position. Thus, for a given joystick deflection, a dual decode joystick produces two independent signals indicative of the X component of that deflection, and two independent signals indicative of the Y component of the deflection. The "normal" and "inverse" signals are usually generated in physically separate output circuits. Thus, malfunctions or faults with the joystick hardware can be detected by comparing X with $X_i$ and Y with $Y_i$.

Figure 2:
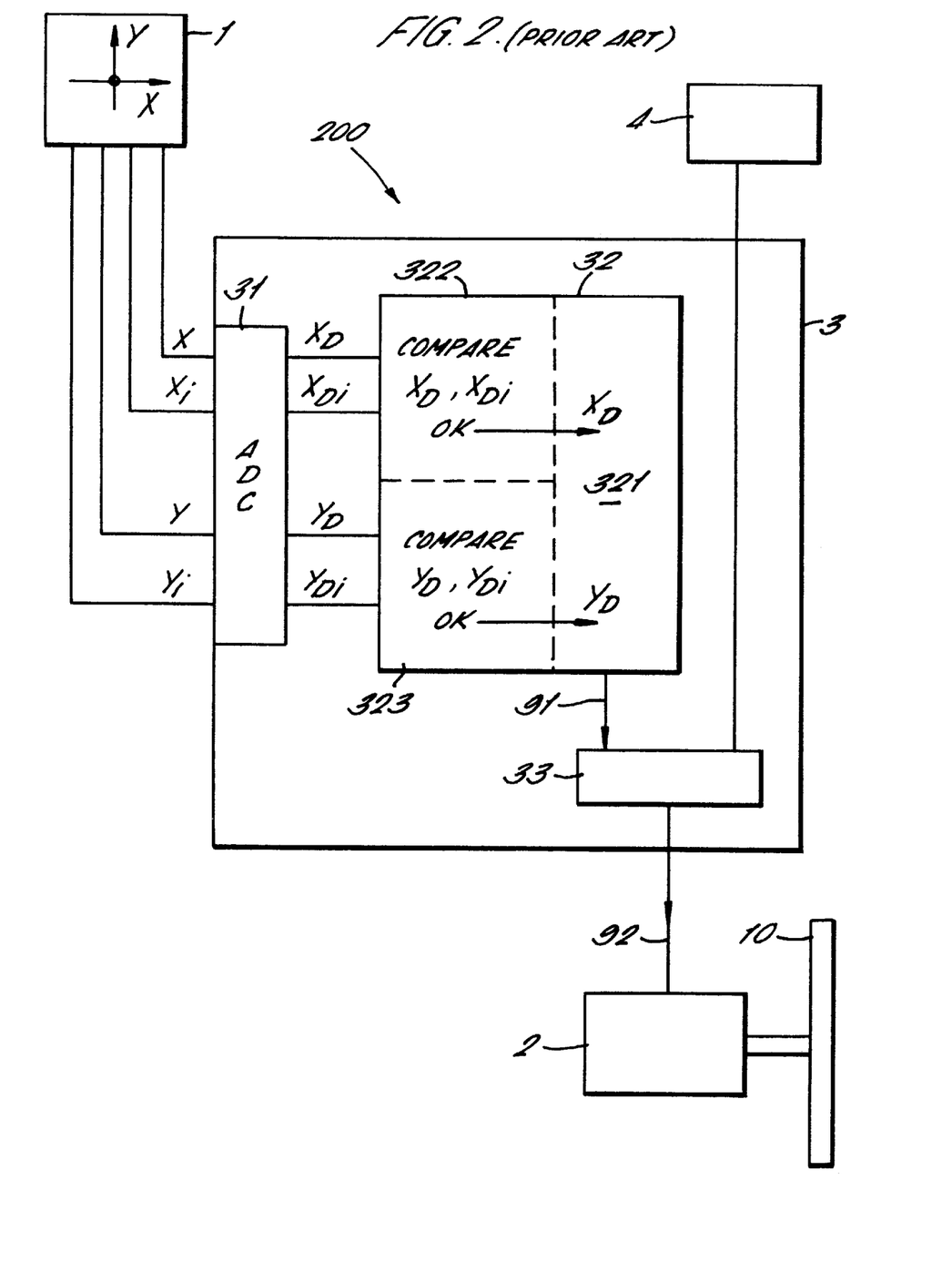
FIG. 2 is a schematic diagram of an electric vehicle incorporating a dual decode joystick in accordance with the prior art.

Electric vehicles employing dual decode joysticks are known, and an example is shown in FIG. 2. Normal and inverse X and Y signals are transmitted to the controller 3 where they are converted into corresponding digital signals by the ADC 31. The digital signals then pass to a processor 32. Three nominal processing operations are performed, represented schematically by regions 321, 322 and 323 in the figure. In the first processing operation 322 the normal and inverse X signals $X_D$ and $X_{Di}$ are compared. If the signals differ by more than a predetermined value (an error threshold) then an error signal is generated. Similarly in the second processing operation 323 the normal and inverse Y signals are compared and an error signal may be generated. It will be apparent that the apparatus may be designed to respond to an error signal (fault indication) in a number of different ways. For example, the vehicle may be brought to a rest by interrupting the power supply from the battery, by applying a brake, by appropriate control of the circuitry 33, or by other means. the controller may also provide an indication to the user or a service engineer that a joystick fault has developed.

Alternatively, if the normal and inverse signals are within the predetermined range or threshold then the normal X and Y signals are passed to the third processing operation 321 by which the control signal 91 is generated.

Although the use of a dual decode joystick represents an improvement on previous arrangements, there are still problems associated with the control apparatus of FIG. 2. In particular, only faults in the joystick and ADC hardware will be detected. Faults associated with the controller hardware and software still, in general, remain undetected and may result in the incorrect control signal being applied to the motor.

It is therefore desirable to address the problems associated with the prior art.

According to a first aspect of the present invention there is provided control apparatus for an electric vehicle, the apparatus comprising:

input means operable to generate a first signal indicative of a component of a desired motion of the vehicle and a second signal independently indicative of said component;

an electric motor arranged to drive a wheel of the vehicle;

a controller arranged to control the motor according to said first signal; and means for generating a signal indicative of a voltage across windings of the motor, the controller further including:

means for calculating a quantity indicative of a nominal expected voltage across said windings according to said second signal;

means for comparing said voltage with said expected voltage; and means for generating an error signal in response to said voltage and expected voltage differing by more than a predetermined amount.

The means for generating a signal indicative of a voltage across windings of the motor may comprise a voltage dividing circuit and/or a filter circuit and the signal may be proportional to an average voltage developed across the windings. The controller may include a microprocessor which may calculate the expected average voltage (or a quantity proportional to it) from the second signal and, for example, from a preprogrammed quantity indicative of the supply voltage from a battery.

Advantageously, the error or fault signal may be generated in response to any error or fault resulting in a sufficiently large difference between the actual and expected (predicted) voltages developed or seen across the motor windings. Thus, this aspect of the present invention provides an error check on all of the control apparatus, including the input means (eg. a joystick), the controller circuitry and any software, and the motor windings themselves.

As such, it represents a considerable improvement in error detection and safety over the prior art. Errors or faults not affecting the voltage developed across the motor windings are, by definition, less serious from a control/safety point of view.

The input means may be further operable to generate third and fourth signals independently indicative of another component of a desired motion of the vehicle, the controller may be arranged to control the motor (ie its speed and direction of rotation) according to the first and third signals, and the calculating means may calculate the quantity indicative of the expected voltage according to the second and fourth signals.

The motor may be brushless and comprise three phase windings.

According to a second aspect of the present invention there is provided, control apparatus for an electric vehicle the apparatus comprising:

input means operable to generate a first signal indicative of a component of a desired motion of the vehicle and a second signal independently indicative of said component;

an electric motor arranged to drive a wheel of the vehicle; and a controller responsive to said first signal to control the motor, the controller including means for generating a control signal to control the motor according to said first signal, means for calculating a nominal expected value of a parameter of said control signal according to said second signal, means for comparing said expected value with an actual value of said parameter, and means for generating a signal indicative of an error in response to said expected and actual values differing by more than a predetermined amount.

The control signal may, for example be a PWM voltage signal used to control switching elements in chopper circuit a PWM voltage signal output from a chopper circuit, or an output voltage from a commutation circuit.

The control signal may be applied directly to a terminal or across terminals (i.e. across windings) of the motor.

The input means may be a joystick and the first and second signals may be indicative of a component of a deflection of the joystick in either the nominal X or nominal Y direction. Advantageously, the second signal may nominally (i.e. provided that the joystick is functioning correctly) be the inverse of the first signal.

Thus, the control signal which is used to determine the speed at which the motor is driven is determined or set according to the first signal, and not the second signal. In contrast to prior art arrangements, rather than comparing the first and second signals (or their digital equivalents) directly, the second input is used to calculate an expected value of a parameter of the control signal, for example its magnitude, its time averaged value or, in the case of the control signal being a pulse with modulated signal, its mark-space ratio or duty cycle. The controller will typically comprise a microprocessor or (microchip) appropriately programmed to allow calculation of the expected value.

The means for comparing the expected and actual values may, for example, compare them directly, or add or subtract them and compare the resultant sum with a predetermined value (amount).

Advantageously, an error signal may be generated in response to a fault, error, or malfunction in the input means hardware, the hardware and software for generating the control signal, and the hardware and software for calculating the expected value. Thus, the control apparatus of the present invention provides more thorough and comprehensive error detection than previous arrangements, and accordingly provides a significant improvement in safety.

Preferably the control signal may be a control voltage applied to one of the motor terminals, or across motor terminals (i.e. a voltage applied across motor windings). Comparing the motor control voltage with an expected value therefore provides an error check on all of the hardware and software up to the motor terminals i.e. all of the hardware and software, from the joystick down, used to control the speed at which the motor is driven. Any fault affecting the motor control voltage should be detected. Of course, any fault not affecting the motor control voltage may not be detected, but by definition, such a fault is not as serious from a control and safety point of view.

According to a third aspect of the present invention there is provided control apparatus for an electric vehicle, the apparatus comprising:

input means operable to generate a first signal indicative of a component of a desired motion of the vehicle and a second signal independently indicative of said component;

an electric motor arranged to drive a wheel of the vehicle; and a controller responsive to said first signal to control the motor, the controller including means for generating a control signal to control the motor according to said first signal, means for generating a signal dependent on said control signal, means for calculating a nominal expected value of a parameter of the dependent signal according to said second signal, means for comparing said expected value with an actual value of said parameter, and means for generating a signal indicative of an error in response to said expected and actual values differing by more than a predetermined amount.

For example, the control signal may be a PWM (pulse-width modulated) signal input to a chopper circuit to control the operation of its switching elements. The output of the chopper circuit, itself a PWM voltage, may be applied across terminals of the motor and the dependent signal may be generated using a voltage divider and filter connected across the terminals. Thus, the dependent signal is dependent on the control signal but is also indicative of the actual voltage appearing across the motor windings. By comparing a parameter of the dependent signal with its expected value, faults can be detected not just in the controller hardware and software but in the motor windings also.

Thus, rather than comparing the control signal or a parameter of it with an expected value, in this third aspect a signal is generated or derived that is dependent on the control signal, and then a parameter of the dependent signal is compared with an expected value. The dependent signal may be generated from the control signal or from an actual motor voltage by smoothing, filtering, or time averaging, and the means for generating the dependent signal may include a voltage divider. Again, advantageously this second aspect enables an error or fault check to be made on the hardware and software (including the input means) used to generate and determine the control signal and hence ultimately the voltage applied to the motor.

The input means may be further operable to generate third and fourth signals independently indicative of another component of a desired motion of the vehicle, and the means for generating the controlled signal may generate the control signal according to the first and third signals, and the calculating means may calculate the nominal expected value using the second and fourth signals. The input means may be a dual decode joystick.

In embodiments of the above described aspects of the present invention, the calculation of the nominal expected value may be performed by a microprocessor or microchip already present in the controller and used to generate the control signal. Thus, the improved error or fault detection may be provided without the need for additional hardware compared with prior art arrangements. The calculation of the expected value, comparison with the actual value, and generation of the error signal may be conveniently achieved by making use of previously redundant processing power.

According to a fourth aspect of the present invention there is provided control apparatus for an electric vehicle, the apparatus comprising:
   input means operable to generate a first signal indicative of a component of a desired motion of the vehicle and a second signal independently indicative of said component;
   an electric motor arranged to drive a wheel of the vehicle; and
   a controller responsive to said first and second signals to control the motor, the controller including
      means for generating a control signal for controlling the motor according to said first signal,
      means for generating a further signal according to said second signal, the further signal being nominally equivalent to or a nominal inverse of said control signal,
      means for comparing a parameter of said control signal with a corresponding parameter of said further signal, and
      means for generating a signal indicative of an error in response to said parameters differing by more than a predetermined amount.

The control signal and further signal may be generated by separate hardware, or conveniently may both be generated by common hardware present in the controller and necessary for the control of the motor. The control signal may be a pulse with modulated signal generated by a microprocessor according to the first input signal, and the further signal may be an "inverse" pulse-width-modulated signal generated from the second input signal. The means for comparing may conveniently compare the duty cycle of the control signal with the duty cycle of the further signal. In the art, "duty cycle" is used to denote the fraction or percentage of unit time interval at which the pulse-width-modulated voltage is in the "high" state, i.e, the duty cycle is related to the mark-space ratio and may be written as duty cycle=mark/(mark+space).

Again, the input means may be further operable to generate third and fourth signals indicative of another component of a desired motion of the vehicle, the control signal may be generated from the first and third signals, and the further signal may be generated from the second and fourth signals.

In embodiments of the above described aspects of the present invention, the control signal may be a pulse-width-modulated voltage signal, and may be an output signal from a chopper circuit. Chopper circuits are well-known and produce a PWM output signal from a constant supply voltage (in the case of electric vehicles, typically from a battery) by appropriate control of switching devices or elements. Alternatively, the control signal may be a PWM signal input to a chopper circuit to control its switching elements.

The motor may comprise brushes and may be controlled by a PWM voltage applied directly across its terminals (i.e. across its windings) or alternatively the motor may be brushless in which case the controller includes commutation circuitry. The control signal may be a voltage signal output from the commutation circuitry.

The control signal may be a voltage signal applied directly to a terminal of the motor, or may be a differential voltage signal applied across terminals of the motor.

The control apparatus may comprise means for measuring or determining the average voltage appearing across the motor terminals. This average voltage will be dependent on the control signal, and may be compared with an expected average voltage calculated by the calculating means.

The motor may be brushless and comprise first, second and third windings, a first end of each winding being connected to a first common point, and a second end of each winding being connected to a respective one of three motor terminals, each motor terminal being connected to a respective output of commutation circuitry included in the controller, each second end being further connected via a respective resistor to a second common point, the second common point being connected to a reference voltage, typically earth, by means of a further resistor and capacitor connected in parallel. The voltage at the second common point is thus indicative of an average voltage across the motor windings, and may be compared with a calculated expected value.

The means for generating a control signal may be further operable to generate a plurality of control signals, and the means for calculating may be further operable to calculate a corresponding plurality of nominal expected values. Each expected value may be compared with a corresponding actual value and an error signal may be generated accordingly.

In other embodiments a plurality of dependent signals may be generated, each corresponding to a respective one of said plurality of control signals, and again each nominal expected value may be compared with a corresponding actual value to determine whether or not to generate an error signal.

In further embodiments a plurality of control signals may be compared with a plurality of corresponding further signals and error signals may be generated accordingly.

Thus, it is possible to compare actual values, or parameters of control signals (or signals derived from control signals) with expected values at a number of points in the control apparatus architecture. This provides the advantage that in addition to simply indicating that a fault or error has occurred, the control apparatus can provide an indication of the location or source of that fault.

In general, between the inputs and outputs of the controller there will be a hierarchy of dependent control signals, and fault diagnosis may be performed at various points in this hierarchy. For example, one level of control signal may be the PWM signal input to a chopper controller to control the operation of its switching elements and a dependent control signal will be the PWM output signal from the chopper.

The control apparatus may further comprise:
   means for slowing the vehicle in response to an error signal. This slowing may be achieved, for example, by interrupting the power supply from a battery, by appropriate control of chopper circuitry or commutation circuitry, by applying a brake, or by other suitable means.

According to a fifth aspect of the present invention there is provided a method of controlling an electric vehicle, the method comprising the steps of:

generating a first signal indicative of a component of a desired motion of the vehicle;

generating a second signal indicative of said component;

controlling a motor according to said first signal, the motor being arranged to drive a wheel of the vehicle;

generating a signal indicative of an actual voltage appearing across windings of the motor;

calculating an expected value for the voltage appearing across said windings using the second signal;

comparing the expected voltage with the actual voltage; and generating an error signal in response to the expected and actual voltages differing by more than a predetermined amount.

Embodiments of the present invention will now be described with reference to the accompanying drawings in which.

Figure 3:
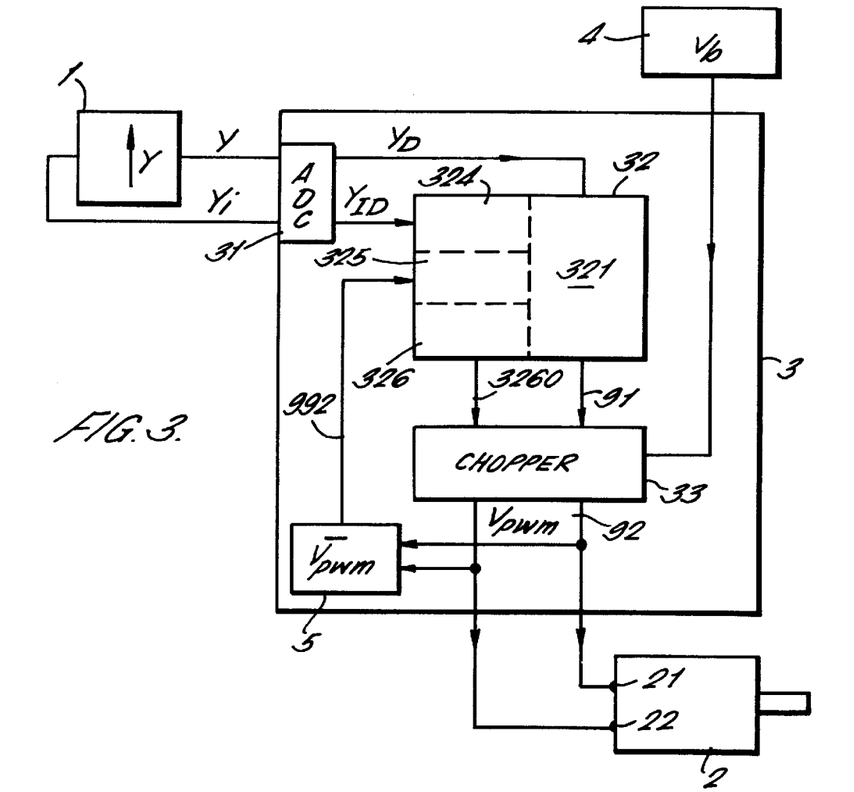
FIG. 3 is a schematic diagram of control apparatus for an electric vehicle in accordance with an embodiment of the present invention.

Referring now to FIG. 3, in this embodiment of the present invention the input means is operable to generate a signal Y indicative of a desired forward motion of the vehicle, and a second signal $Y_i$ which is nominally the inverse of the first signal Y, provided that the input means is functioning correctly. The two input signals are transmitted to a controller 3 where they are converted into digital signals $Y_D$ and $Y_{id}$ by an ADC 31. the normal digital signal $Y_D$ is input to a microprocessor 32 which generates a control signal 91 from $Y_D$ in a processing operation 321 the control signal 91 is a PWM signal for controlling switching devices in a chopper control circuit 33. The chopper circuit 33 is connected to a battery 4 of voltage $V_b$ and control of the chopper switching elements by control signal 91 generates a PWM voltage across output terminals of the chopper circuit 33. The output voltage signal from the chopper 33 is a further control signal 92 and is applied across terminals, 21,22 of an electric motor 2.

The controller 3 includes means 5 for monitoring the PWM chopper output 92 which generates a signal 992 dependent on the further control signal 92 and indicative of its time averaged value.

The inverse digital input $Y_{ID}$ is input to the microprocessor 32 which performs a processing operation 324 to calculate an expected value of the signal from the monitoring means 5. This expected value is calculated from $Y_{ID}$, and also from values indicative of the battery voltage $V_b$ and parameters of components in the monitoring means 5, these values being pre-programmed into the microprocessor 32.

The actual signal 992 generated by the monitoring means 5 is fed back to the microprocessor 32 where it is compared with its expected value in processing operation 325. If the actual value and the expected value differ by more than a predetermined amount, then an error signal 3260 is generated in a further processing operation 326.

In this example the error signal 3260 is routed to the chopper 33 which is arranged to respond by reducing the voltage applied to the motor.

In this example, the microprocessor 32 is required for generating the chopper switching element control signal 91, and the processing operations 324, 325, 326 associated with error or fault detection are performed using spare processing capacity of the microprocessor 32.

Figure 4:
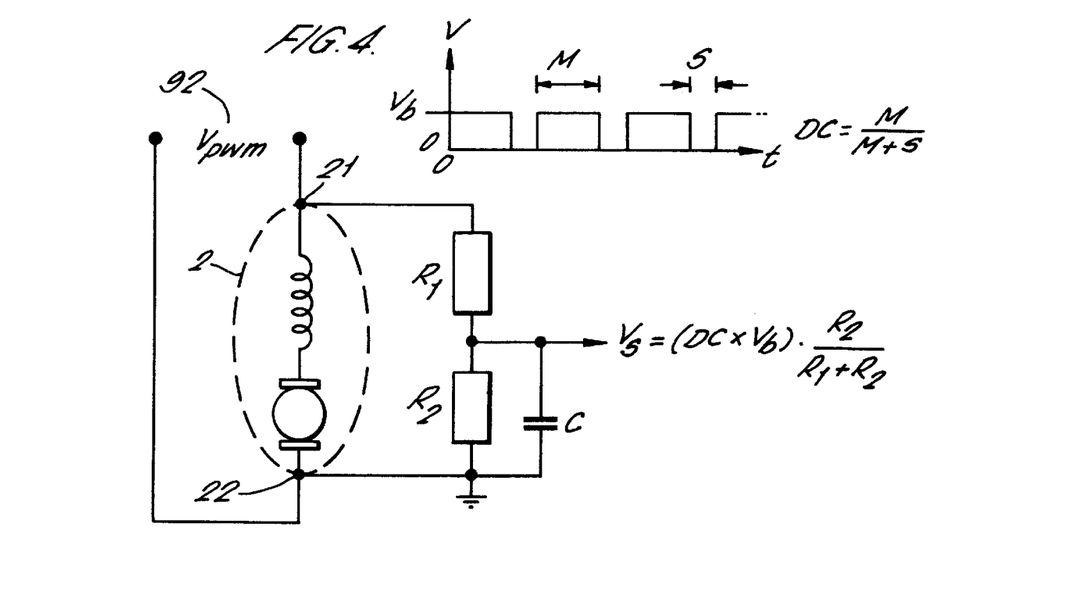
FIG. 4 is a schematic diagram of a combined voltage divider and filter circuit suitable for generating a signal dependent on a control signal in embodiments of the present invention.

Referring now to FIG. 4, this schematic diagram shows an example of a circuit suitable for generating a dependent signal $V_s$ indicative of a control signal $V_{pwm}$ 92 in embodiments of the present invention. The circuit is arranged such that the dependent signal $V_s$ is a simple function of control signal and circuit element parameter values, and may easily be predicted by appropriate programming of the calculating means (the microprocessor). In this figure, the voltage signal 92 is applied across terminals 21, 22 of the motor 2 and the dependent signal generating circuit is a combined voltage divider and filter circuit comprising two resistors $R_1$ and $R_2$ connected in series with a capacitor connected in parallel with $R_2$. The variation of the control signal 92 voltage with time is shown in the inset to the figure, where the mark and space are denoted by M and S respectively. Thus, for this signal, the duty cycle DC=M/(M+S).

Appropriate choice of the capacitor C provides a dependent signal $V_s$ given by the relation:

$$V_s = (DC \cdot V_b) \cdot R_2/(R_1+R_2)$$

Figure 5:
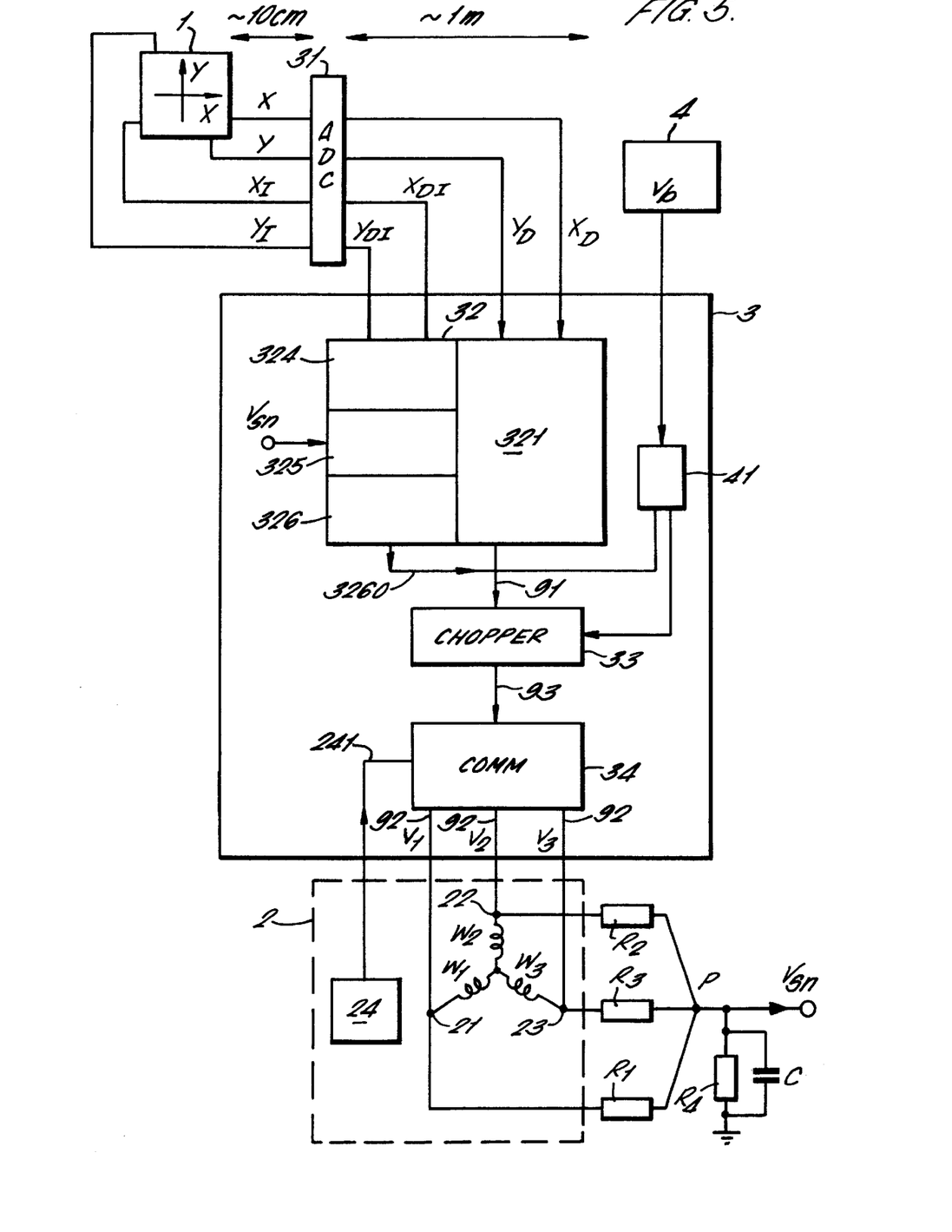
FIG. 5 is a schematic diagram of control apparatus in accordance with a further embodiment of the present invention.

Referring now to FIG. 5, in another embodiment of the present invention the input means 1 is a dual decode joystick producing normal and inverse X and Y outputs. In this example these outputs are analogue signals and are transmitted to a remote analogue to digital converter 31 along wires of approximate length 10 cm. Corresponding digital signals are transmitted to the controller 3 long wires having lengths of the order of 1 m. The advantage of performing analogue to digital conversion close to the input means (i.e. the source of the input signals) is that the digital signals are less susceptible to noise pick-up.

The normal digital signals $X_D$ and $Y_D$ are input to a microprocessor 32 where a processing operation 321 is performed to generate a PWM control signal 91 for controlling switching elements in a chopper circuit 33. The chopper circuit 33 is connected to a battery 4 of voltage $V_b$ by means of an interrupter 41 and the chopper generates a control signal 93 which is a PWM voltage signal. This control signal 93 is input to a commutation circuit 34 whose outputs are connected to terminals 21, 22, 23 of a brushless DC motor 2. The motor 2 includes position sensing means 24 generating a signal 241 indicative of the position of the motor rotor with respect to the stator windings $W_1$, $W_2$ and $W_3$. In response to the position signal 241 and control signal 93 the commutation circuit 34 controls the voltages $V_1$, $V_2$ and $V_3$ applied to the terminals 21, 22, 23 of the motor. Thus, $V_1$, $V_2$, $V_3$ are control signals.

Motor terminal 22 is connected via resistor $R_2$ to a point P, and terminal 21 and 23 are connected to point P by resistors $R_1$ and $R_3$ respectively. Point P is connected to earth via resistor $R_4$ and capacitor C connected in parallel and a voltage signal $V_{sn}$ from point P is input to the microprocessor 32.

Resistor $R_4$ and capacitor C act as a filter and ensure that high frequency components do not appear in the signal $V_{sn}$. Resistors $R_1$, $R_2$, $R_3$ and $R_4$ form a potential divider, and the combined effect of the potential divider and filter circuits is that $V_{sn}$ is effectively indicative of the average voltage applied across the motor windings.

$V_{sn}$ is determined by the relation:

$$V_{sn}=(DC\cdot V_b)\cdot R_4/(R_1+R_2+R_3+R_4)$$

The inverse digital input signals $X_{DI}$ and $Y_{DI}$ are fed to the microprocessor 32 where a processing operation 324 is performed to calculate an expected value of $V_{sn}$. In a further processing operation 325 the actual value of $V_{sn}$ from point P is compared with the expected value and in a further processing operation 326 an error signal 3260 is generated if the actual and expected values differ by more than a predetermined amount.

The error signal 3260 is fed to the interrupter 41 which in response to receiving the error signal 3260 interrupts the supply of power from the battery 4 to the chopper 33.

Monitoring the actual voltage across motor windings in this way and comparing the value with an expected value is particularly advantageous as the error detection is able to detect faults not just with the controller hardware and software but with the motor windings also.

Figure 6:
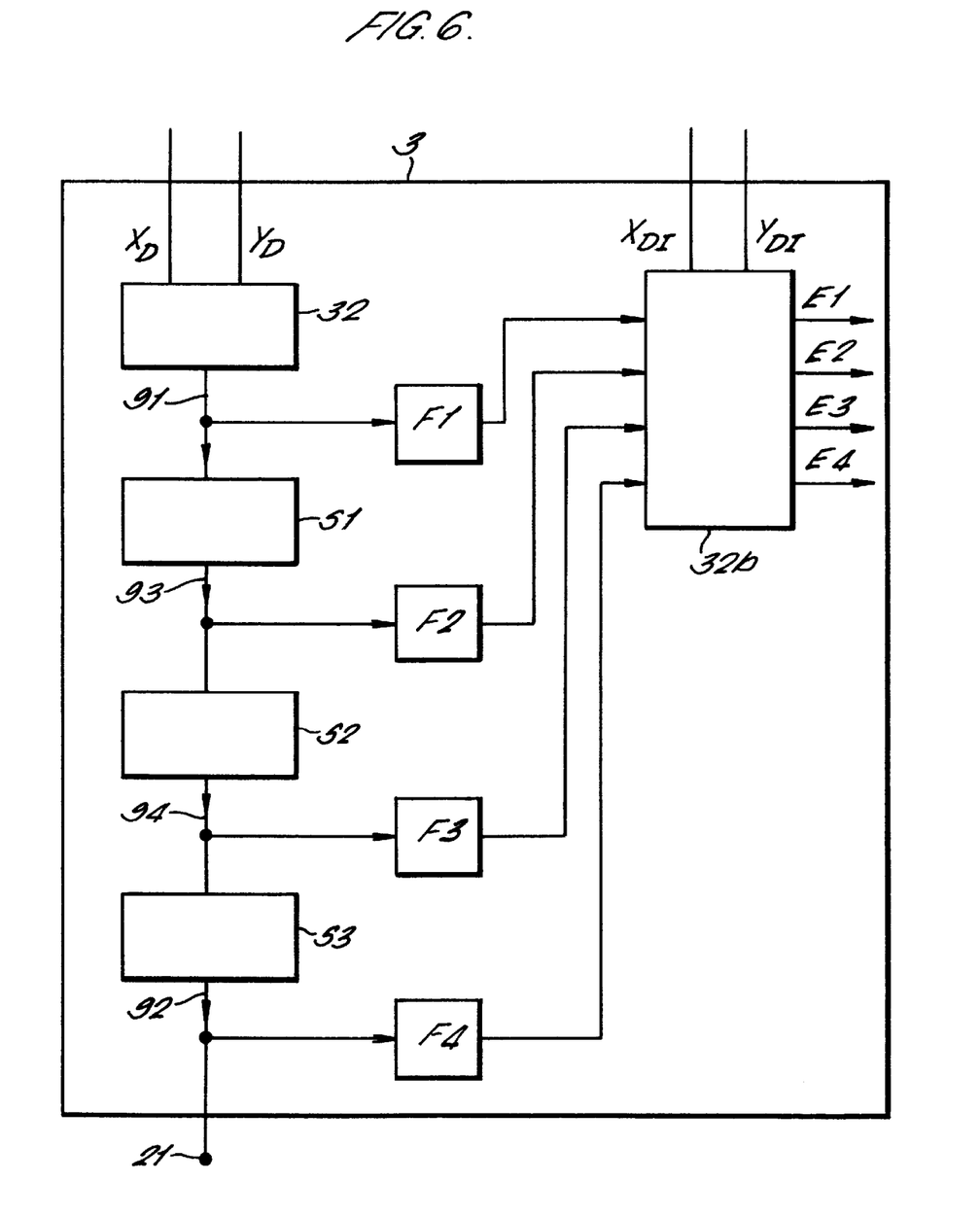
FIG. 6 is a schematic diagram of a controller in accordance with an embodiment of the present invention.

Referring not to FIG. 6, this example shows a controller for an electric vehicle, the controller being in accordance with an embodiment of the present invention. The controller 3 is arranged to receive normal input signals $X_D$ and $Y_D$ from input means and to generate a control signal 91 from these normal inputs using a processor 32. The control signal 91 is input to a controller stage $S_1$, which may for example be a chopper circuit or some other circuit for generating a voltage. Stage S1 generates a further control signal 93 according to the input control signal 91 and this further control signal is input to a second stage S2. Similarly, stage S2 generates a further control signal 94 which is fed to a final stage S3 which generates a control signal 92 which is then applied to a terminal 21 of a motor.

Each of the control signals 91, 93, 94 and 92 is fed to a respective filter circuit F1, F2, F3, F4 which then passes a filtered control signal to a second microprocessor $32_b$.

The second processor $32_b$ is arranged to receive inverse input signals from the input means and from them calculates expected values of the filtered control signals. Each expected value is compared with the corresponding actual value, and if these values differ by more than a predetermined amount a corresponding error signal E1, E2, E3, E4 is generated.

Thus, the error signals E1, E2, E3 and E4 provide an indication of the controller stage (i.e. the location) at which a fault has occurred.

Each feature disclosed in this specification (which term includes the claims) and/or shown in the drawings may be incorporated in the invention independently of other disclosed and/or illustrated features.

In another embodiment, the electric vehicle (wheelchair) control system employs a comprehensive safety system that extends dual decode technology from the joystick throughout the entire wheelchair control system in both software and hardware. The embodiment uses an otherwise redundant inverse drive system that takes inverse outputs from the joystick, calculates the motor response and checks the motor response controlled by the normal half of the system. If there is a difference between the normal and inverse system then the system will shutdown under safe conditions.

In another embodiment the drive apparatus (Power Module) employs a Dual Decode safety system. This system has independent normal and inverse control channels throughout the joystick, smartlink (ie remote ADC+ associated wiring), and software control algorithms. The system takes the normal and inverse outputs from a dual decode joystick and uses the normal channel to generate PWM waveforms to control the motors. The inverse channel is used to calculate expected motor voltages which when compared with the actual provide a checksum for the whole system. The checksum error threshold shall be set such that any component or software error affecting the motor speed may be detected and standby mode initiated. Errors shall include:

Software error

Joystick malfunction

Drive circuit malfunction

Commutation system malfunction

Thus, the system incorporates voltage feedback from the brushless motor for use in error/fault diagnosis.

What is claimed is:

1. A control apparatus for an electric vehicle, the apparatus comprising:

input means operable to generate a first signal indicative of a component of a desire motion of the vehicle and a second signal independently indicative of said component;

an electric motor arrange to drive a wheel of the vehicle;

a controller arranged to control the motor according to said first signal; and means for generating a signal indicative of a voltage across windings of the motor, the controller further including:

means for calculating a quantity indicative of a nominal expected voltage across said windings according to said second signal;

means for comparing said voltage with said expected voltage; and means for generating an error signal in response to said voltage and expected voltage differing by more than a predetermined amount.

2. A control apparatus for an electric vehicle, the apparatus comprising:

input means operable to generate a first signal indicative of a component of a desired motion of the vehicle and a second signal independently indicative of said component;

an electric motor arranged to drive a wheel of the vehicle; and a controller responsive to said first signal to control the motor, the controller including means for generating a control signal for controlling said motor according to said first signal, means for calculating a nominal expected value of a parameter of said control signal according to said second signal, means for comparing said expected value with an actual value of said parameter, and means for generating a signal indicative of an error in response to said expected and actual values differing by more than a predetermined amount.

3. A control apparatus for an electric vehicle, the apparatus comprising:

input means operable to generate a first signal indicative of a component of a desired motion of the vehicle and a second signal independently indicative of said component;

an electric motor arranged to drive a wheel of the vehicle; and a controller responsive to said first signal to control the motor, the controller including means for generating a control signal for controlling said motor according to said first signal, means for generating a signal dependent on said control signal, means for calculating a nominal expected value of a parameter of the dependent signal according to said second signal, means for comparing said expected value with an actual value of said parameter, and means for generating a signal indicative of an error in response to said expected and actual values differing by more than a predetermined amount.

4. The control apparatus in accordance with claim 3 wherein said control signal is a voltage signal, and said means for generating a signal dependent on said control signal comprises at least one of a voltage dividing circuit and a filter circuit.

5. The control apparatus in accordance with claim 2, wherein said input means is further operable to generate a third signal independently indicative of another component of a desire motion of the vehicle and a fourth signal independently indicative of said another component, the means for generating the control signal generates the control signal according to said first and third signals, and the calculating means calculates the nominal expected value according to the second and fourth signals.

6. A control apparatus for an electric vehicle, the apparatus comprising:

input means operable to generate a first signal indicative of a component of a desired motion of the vehicle and a second signal independently indicative of said component;

an electric motor arranged to drive a wheel of the vehicle; and a controller responsive to said first and second signals to control the motor, the controller including means for generating a control signal for controlling the motor according to said first signal, means for generating a further signal according to said second signal, the further signal being nominally equivalent to or a nominal inverse of said control signal, means for comparing a parameter of said control signal with a corresponding parameter of said further signal, and means for generating a signal indicative of an error in response to said parameters differing by more than a predetermined amount.

7. A control apparatus in accordance with claim 6, wherein said input means is further operable to generate a third signal independently indicative of another component of a desired motion of the vehicle, and a fourth signal independently indicative of said another component, the means for generating the control signal generates the control signal according to said first and third signals, and the means for generating a further signal generates the further signal according to said second and fourth signals.

8. The control apparatus in accordance with claim 2, wherein said parameter is one of the group consisting of: voltage, magnitude, polarity, mark-space ratio, duty cycle, time-averaged-magnitude, and time-averaged-voltage.

9. The control apparatus in accordance with claim 2 wherein said control signal comprises a pulse-width-modulated voltage signal.

10. The control apparatus in accordance with claim 9, wherein the controller includes a chopper circuit and said control signal is an output signal from the chopper circuit.

11. The control apparatus in accordance with claim 2 wherein the motor is brushless, the controller includes commutation circuitry, and the control signal is a voltage signal output from the commutation circuitry.

12. The control apparatus in accordance with claim 2 where said control signal is a voltage signal applied to a terminal of the motor.

13. The control apparatus in accordance with claim 2 wherein said control signal is a voltage signal applied across terminals of the motor.

14. The control apparatus in accordance with claim 3, wherein said dependent signal is indicative of a voltage across windings of the motor.

15. The control apparatus in accordance with claim 14 wherein said motor is brushless and comprises first, second and third windings, a first end of each winding being connected to a first common point, and a second end of each winding being connected to a respective one of three motor terminals, each motor terminal being connected to a respective output of commutation circuitry including the controller, each said second end being further connected via a respective resistor to a second common point, the second common point being connected to a reference voltage by means of a further resistor and capacitor connected in parallel, the dependent signal being the voltage at said second common point.

16. The control apparatus in accordance with claim 2, wherein said means for generating a control signal is further operable to generate a plurality of said control signals, said means for calculating is further operable to calculate a corresponding plurality of nominal expected values, said means for comparing is operable to compare each expected value with a corresponding actual value, and said means for generating a signal indicative of an error is operable to generate an error signal in response to any expected value and corresponding actual value differing by more than a predetermined amount.

17. The control apparatus in accordance with claim 3, wherein said means for generating a control signal is further operable to generate a plurality of said control signals, the means for generating a dependent signal is further operable to generate a plurality of dependent signals, each corresponding to a respective control signal, said means for calculating is further operable to calculate a corresponding plurality of nominal expected values, said means for comparing is operable to compare each expected value with a corresponding actual value, and said means for generating a signal indicative of an error is operable to generate an error signal in response to any expected value and corresponding actual value by more than a predetermined amount.

18. The control apparatus in accordance with claim 6, wherein said means for generating a control signal is further operable to generate a plurality of said control signals, said means for generating a further signal is further operable to generate a plurality of said further signals each being nominally equivalent to a respective one of said control signals, said means for comparing being operable to compare a parameter of each control signal with a corresponding parameter of the respective further signal, and the means for generating a signal indicative of an error being operable to generate an error signal in response to any compared parameters differing by more than a predetermined amount.

19. The control apparatus in accordance with claim 16 wherein said plurality of control signals are hierarchical.

20. The control apparatus in accordance with claim 16 wherein the controller is operable to provide an indication of a fault location in response to said error signals.

21. The control apparatus in accordance with claim 1, further comprising means for slowing the vehicle in response to an error signal.

22. An electric vehicle comprising the control apparatus in accordance with claim 1.

23. A method of controlling an electric vehicle, the method comprising the steps, of:
   generating a first signal indicative of a component of a desired motion of the vehicle;
   generating a second signal indicative of said component;
   controlling a motor according to said first signal, the motor being arranged to drive a wheel of the vehicle;
   generating a signal indicative of an actual voltage appearing across windings of the motor;
   calculating an expected value for the voltage appearing across said windings using the second signal;
   comparing the expected voltage with the actual voltage; and
   generating an error signal in response to the expected and actual voltages differing by more than a predetermined amount.

24. The method in accordance with claim 23, wherein the step of controlling comprises the step of
   generating a control signal according to the first signal and applying the control signal across said windings.

25. A method for controlling an electric vehicle, the method comprising the steps of:
   generating a first signal indicative of a component of a desired motion of the vehicle;
   generating a second signal indicative of said component;
   generating a control signal according to said first signal;
   controlling a motor according to said control signal, the motor being arranged to drive a wheel of the vehicle;
   calculating a nominal expected value of a parameter of the control signal according to the second signal;
   comparing the expected value with an actual value of said parameter; and
   generating an error signal in response to said expected and actual values differing by more than a predetermined amount.

26. A method for controlling an electric vehicle, the method comprising the steps of:
   generating a first signal indicative of a component of a desired motion of the vehicle;
   generating a second signal indicative of said component;
   generating a control signal according to said first signal;
   controlling a motor according to said control signal, the motor being arranged to drive a wheel of the vehicle;
   generating a signal dependent on said control signal;
   calculating a nominal expected value of a parameter of said dependent signal according to the second signal;
   comparing the expected value with an actual value of said parameter; and
   generating an error signal in response to said expected and actual values differing by more than a predetermined amount.

27. A method for controlling an electric vehicle, the method comprising the steps of:
   generating a first signal indicative of a component of a desired motion of the vehicle;
   generating a second signal indicative of said component;
   generating a control signal according to said first signal;
   controlling a motor according to said control signal, the motor being arranged to drive a wheel of the vehicle;
   generating a further signal according to the second signal, the further signal being nominally equivalent to or a nominal inverse of said control signal;
   comparing a parameter of the control signal with a corresponding parameter of the further signal; and
   generating an error signal in response to said parameters differing by more than a predetermined amount.

28. The method in accordance with claim 23, further comprising the steps of:
   generating a third signal indicative of another component of said desired motion; and
   generating a fourth signal indicative of said another component, the motor being controlled according to said first and third signals, and the expected value being calculated using the second and fourth signals.

29. The method in accordance with claim 25, further comprising the steps of:
   generating a third signal indicative of another component of said desired motion; and
   generating a fourth signal indicative of said another component,
   the control signal being generated according to the first and third signals, and the expected value being calculated according to the second and fourth signals.

30. The method in accordance with claim 27 further comprising the steps of:
   generating a third signal indicative of another component of said desired motion; and
   generating a fourth signal indicative of said another component,
   the control signal being generated according to the first and third signals, and the further signal being generated according to the second and fourth signals.

31. A control apparatus for controlling an electrical device, the apparatus comprising:
   input means operable to generate a first signal indicative of a desired operation of the device and a second signal independently indicative of
   said desired operation; and a controller responsive to said first signal to
   control the device, the controller including means for generating a control signal for controlling said device according to said first signal, means for generating a signal dependent on said control signal, means for calculating a nominal expected value of a parameter of the dependent signal according to said second signal, means for comparing said expected value with an actual value of said parameter, and means for generating a signal indicative of an error in response to said expected and actual values differing by more than a predetermined amount.

32. A method for controlling an electrical device, the method comprising the steps of:

generating a first signal indicative of a desired operation of the device;

generating a second signal indicative of said desired operation;

generating a control signal according to said first signal;

controlling the device according to said control signal;

generating a signal dependent on said control signal;

calculating a nominal expected value of a parameter of said dependent signal according to the second signal;

comparing the expected value with an actual value of said parameter; and generating an error signal in response to said expected and actual values differing by more than a predetermined amount.

* * * * *